(12) United States Patent
Yamazaki (10) Patent No.: US 8,272,416 B2
(45) Date of Patent: Sep. 25, 2012

(54) HEAVY-LOAD TIRE (75) Inventor: Kazumi Yamazaki, Kobe (JP)

(73) Assignee: Sumitomo Rubber Industries, Ltd., Kobe-Shi, Hyogo (JP)

(*) Notice: Subject to any disclaimer, the term of this patent is extended or adjusted under 35 U.S.C. 154(b) by 241 days.

(21) Appl. No.: 12/700,265

(22) Filed: Feb. 4, 2010

(65) Prior Publication Data
US 2010/0230026 A1 Sep. 16, 2010

(30) Foreign Application Priority Data

Mar. 13, 2009 (JP) ................. 2009-061688

(51) Int. Cl.
*B60C 15/06* (2006.01)
*B60C 5/14* (2006.01)

(52) U.S. Cl. ........ 152/510; 152/543; 152/539; 152/549; 152/552

(58) Field of Classification Search ............. 152/510, 152/543
See application file for complete search history.

(56) References Cited

U.S. PATENT DOCUMENTS

| 4,609,023 A | 9/1986 | Loser | |
| 5,499,670 A * | 3/1996 | Billieres | 152/543 |
| 7,172,002 B2 * | 2/2007 | Ueyoko et al. | 152/510 |
| 2005/0211360 A1 * | 9/2005 | Ishida | 152/510 |
| 2007/0074799 A1 * | 4/2007 | Nakane et al. | 152/510 |
| 2007/0113944 A1 * | 5/2007 | Ueyoko et al. | 152/510 |
| 2008/0093001 A1 * | 4/2008 | Ono | 152/510 |
| 2008/0283170 A1 * | 11/2008 | Maruoka | 152/539 |

FOREIGN PATENT DOCUMENTS

| EP | 0 997 325 A1 | | 5/2000 |
| JP | 2001233013 A | * | 8/2001 |
| JP | 2002166710 A | * | 6/2002 |
| JP | 2002-205508 A | | 7/2002 |
| JP | 2005096621 A | * | 4/2005 |
| JP | 2005112042 A | * | 4/2005 |

* cited by examiner

*Primary Examiner* — Justin Fischer
*Assistant Examiner* — Philip N Schwartz
(74) *Attorney, Agent, or Firm* — Birch, Stewart, Kolasch & Birch, LLP (57) ABSTRACT

A heavy-load tire comprises a tread portion, a pair of sidewall portions, a pair of bead portions each with a bead core therein, a carcass comprising a carcass ply of cords including a main portion and a pair of turnup portions, and an inner liner made from air-impermeable rubber and disposed on the tire internal cavity surface. The inner liner includes a radially inner portion that terminates radial inside than a lateral reference line passing through the innermost axial point and outermost axial point of the bead core. A rubber thickness ta is in a range of from 2.5 to 5.0 mm ranging from the tire internal cavity surface to the cord of the carcass ply on the lateral reference line, and an inner liner thickness tb is smaller than the rubber thickness ta and is in a range of from 0.5 to 3.0 mm on the lateral reference line.

3 Claims, 5 Drawing Sheets

PRIOR ART

HEAVY-LOAD TIRE

BACKGROUND OF THE INVENTION

1. Technical Field

The present invention relates to a heavy-load tire possessing improved bead durability achieved by effectively preventing CBU (Cord Broken Up) of carcass cords that pass near the bead core on the axial inner side of the tire.

2. Related Art

Figure 5:
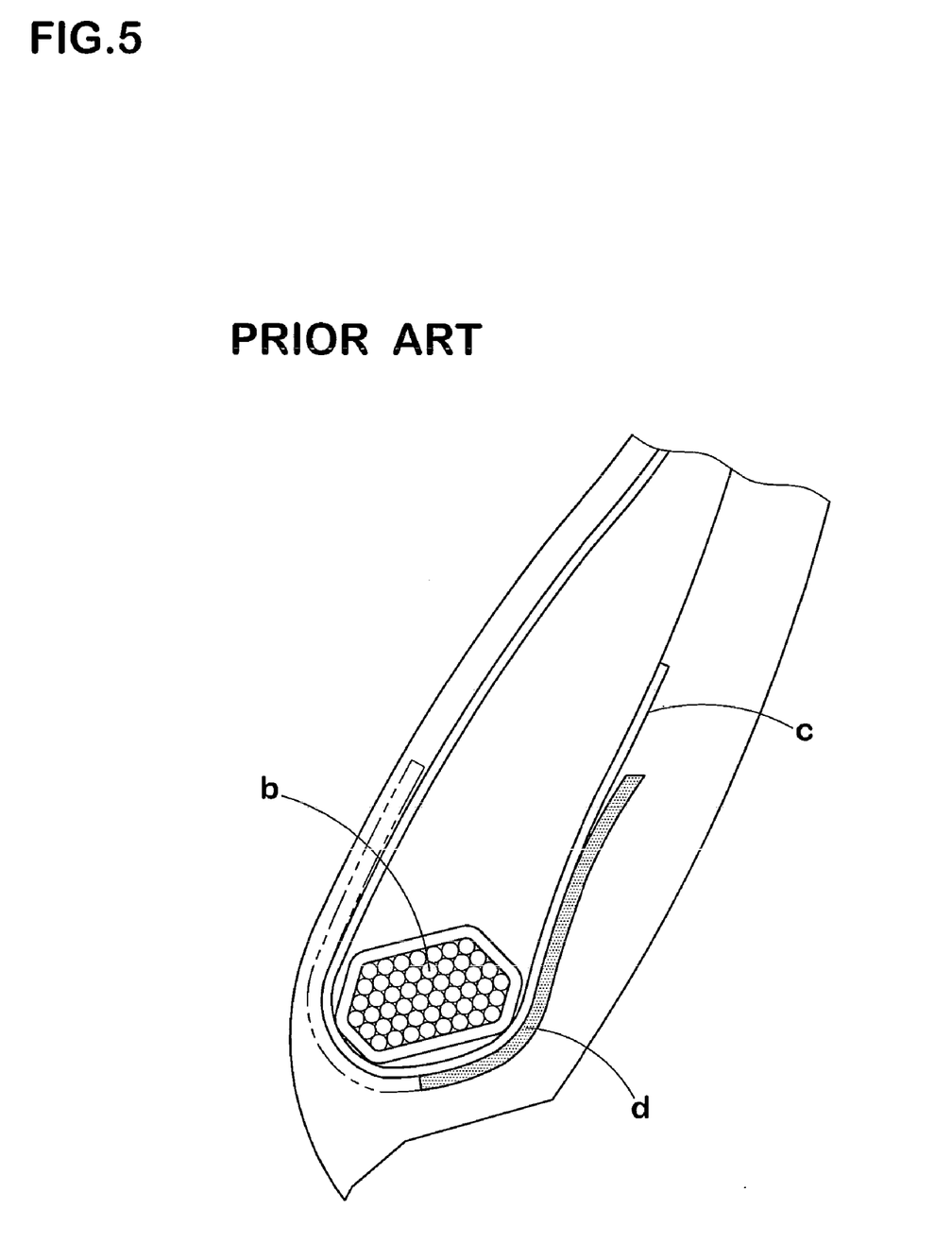
FIG. 5 is a cross sectional view of a bead portion of a conventional heavy-load tire.

FIG. 5 shows a typical structure of the bead portion on a conventional heavy-load tubeless type tire. The bead portion usually includes a bead core "b" of metallic wire extending in a ring shape along the tire circumference, a carcass ply "c" of a steel cords turned around the bead core "b", and a bead reinforcing layer "d" of steel cord with an L-shaped cross section arrayed along the carcass ply "c". See Japanese Patent Application Publication No. 2002-205508.

Heavy-load tires with this type of bead portion structure are used under severe conditions including heavy loads and high internal pressures, causing the carcass cords to rupture or cord broken up (hereinafter simply referred to as "CBU"). The present inventors found that CBU occurs frequently on the bead core "b" on the axial inner side of the tire.

SUMMARY OF THE INVENTION

The present inventors conducted an extensive study on measures to prevent CBU from occurring on the axial inner side of the bead core "b", and as a result identified a main cause of CBU, namely early stage corrosion on the carcass cords caused by moisture in the air filling the tire internal cavity. More specifically, incorrect placement of an inner liner causes moisture in the air filling the tire internal cavity to permeate through the rubber and reach the carcass cords extending along the axial inner side of the bead core "b", and corrode the carcass cords. The problem of CBU tend to occur particularly often in tires having a bead reinforcing layer "d" with an L-shaped cross section instead of the U-shaped cross section shown by the solid and broken lines in FIG. 5, because the L-shaped bead reinforcing layer does not effectively block moisture.

In view of the aforementioned problems, an object of the present invention is to provide a heavy-load tire possessing improved bead durability achieved by long-term prevention of problems such as carcass cord corrosion and cord loosening that are typically prone to occur in L-shaped bead reinforcing layers.

A heavy-load tire according to the present invention, comprises a tread portion, a pair of sidewall portions, a pair of bead portions each with a bead core therein, a carcass comprising a carcass ply of cords including a main portion extending between the bead cores through the tread portion and the sidewall portions, and a pair of turnup portions each turned up around the bead core from the axially inside to the outside of the tire, and an inner liner made from air-impermeable rubber and disposed on the tire internal cavity surface, wherein each bead portion includes a bead reinforcing layer with an L-shaped cross section, the bead reinforcing layer comprising an axially outer piece portion disposed along the axially outside the turnup portion and a bottom piece portion integral with the outer piece portion and terminating in a sub-core area between a first radial line extending inwards along the radial direction of the tire from an innermost axial point of the bead core, and a second radial line extending inwards along the radial direction of the tire from an outermost axial point of the bead core, the inner liner includes a radially inner portion that terminates radial inside than a lateral reference line passing through the innermost axial point and outermost axial point of the bead core, a rubber thickness ta is in a range of from 2.5 to 5.0 mm ranging from the tire internal cavity surface to the cord of the carcass ply on the lateral reference line, and an inner liner thickness tb is smaller than the rubber thickness ta and is in a range of from 0.5 to 3.0 mm on the lateral reference line.

In the present invention, the radially inner portion of the inner liner terminates farther towards the radially inside than the lateral reference line passing through the axial innermost point and axial outermost point of the bead core. The heavy-load tire is also limited to a rubber thickness ta of 2.5 to 5.0 mm from the tire internal cavity surface to the cord of the carcass ply, and further to an inner liner thickness tb that is smaller than the rubber thickness ta and moreover between 0.5 and 3.0 mm. This effectively prevents moisture in the filled air from entering the carcass and so inhibits corrosion of the cords for a long period of time, thereby effectively preventing CBU even in heavy-load tires with bead reinforcing layers having an L-shaped cross section.

DETAILED DESCRIPTION OF THE PREFERRED EMBODIMENT

An embodiment of the present invention will next be described with reference to the figures.

Figure 1:
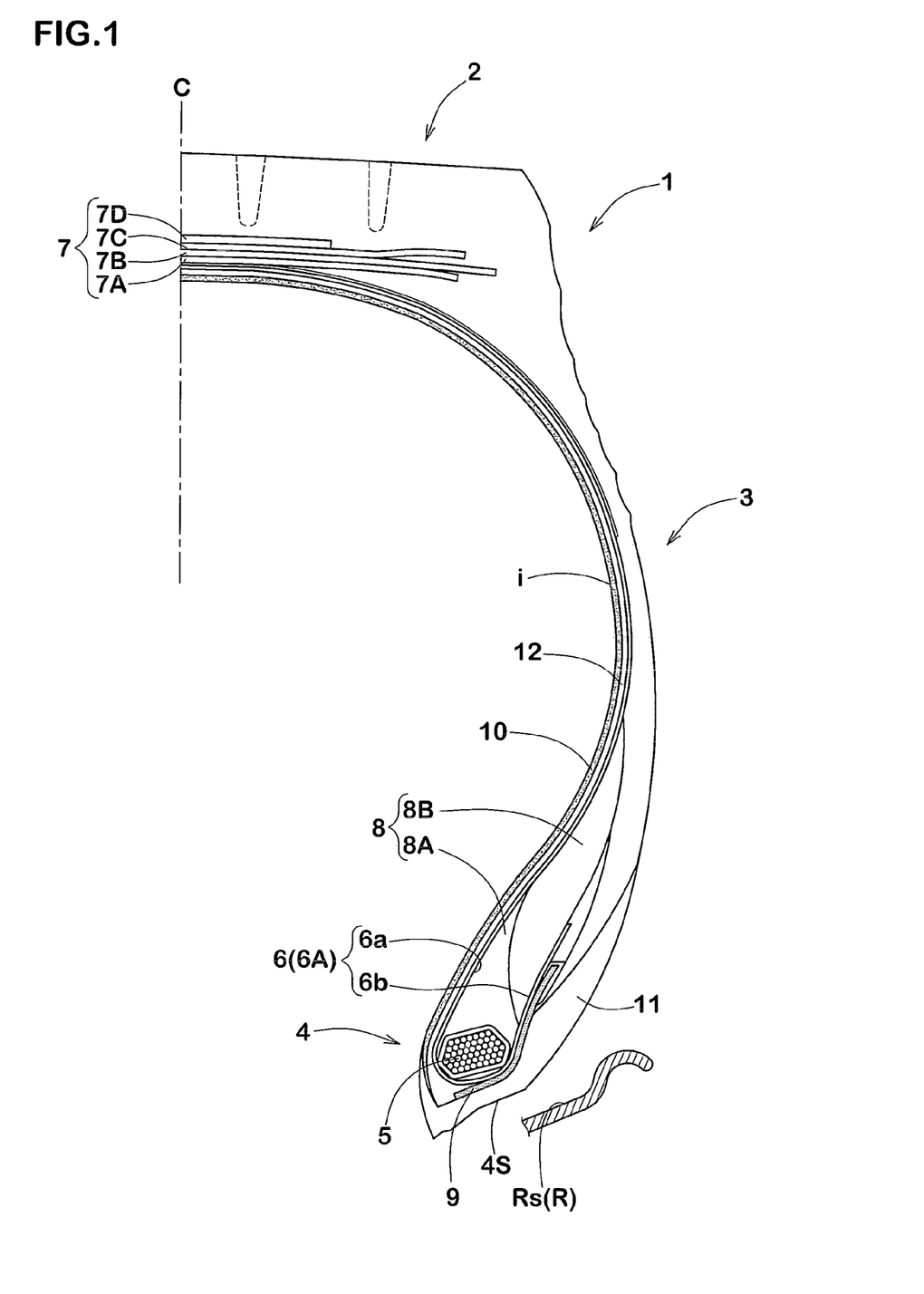
FIG. 1 is a cross sectional view showing an embodiment of the heavy-load tire of the present invention.
Figure 2:
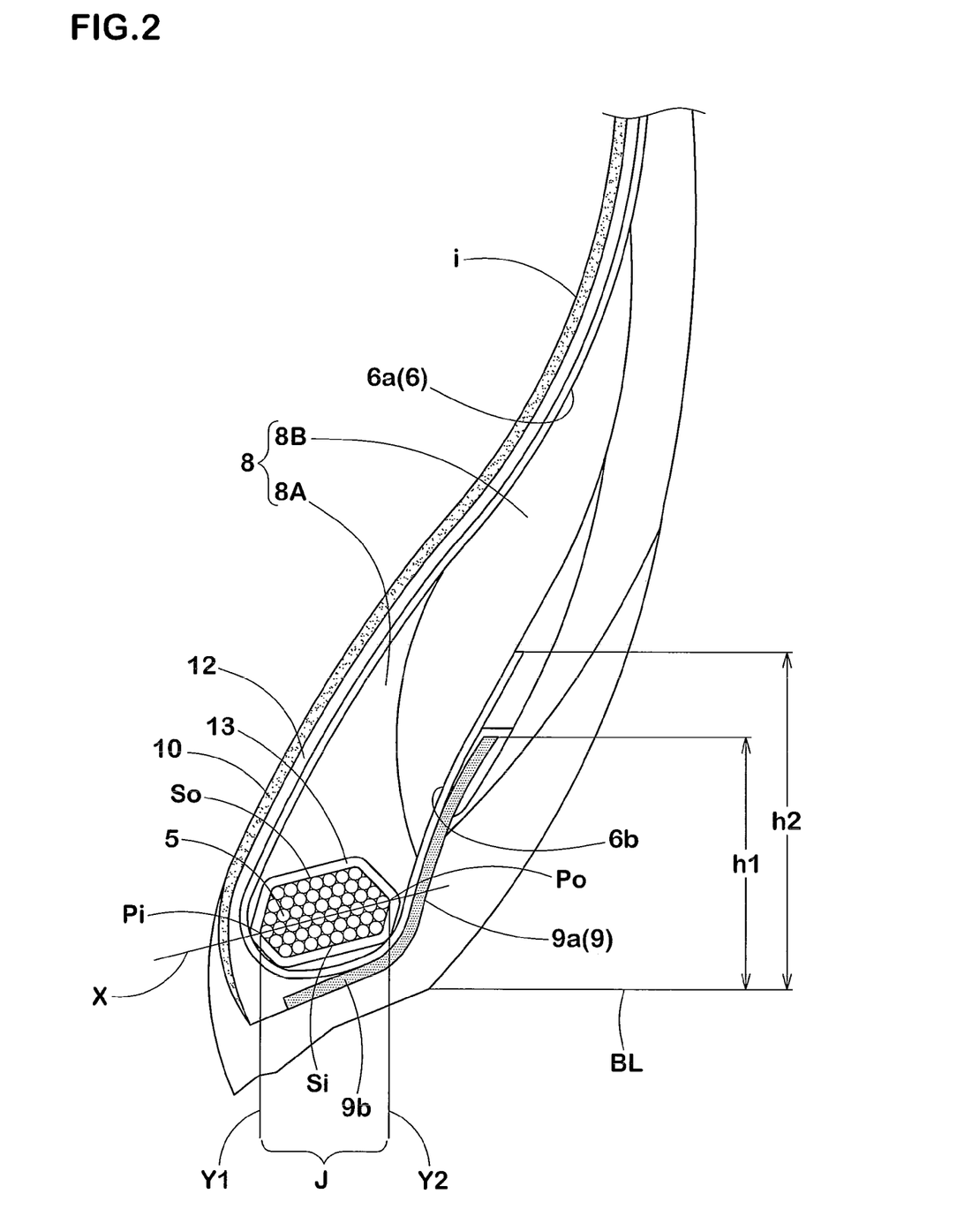
FIG. 2 is an enlarged cross sectional view showing a bead portion of that heavy-load tire.

FIG. 1 is a cross sectional view of a heavy-load tubeless type tire of the present embodiment. FIG. 2 is an enlarged cross sectional view of a bead portion of the heavy-load tire.

Referring to FIG. 1, a heavy-load tire 1 of the present embodiment comprises a tread portion 2, a pair of sidewall portions 3, a pair of bead portions 4 each with a bead core 5 therein, a toroidal carcass 6 extending from the tread portion 2 through the sidewall portions 3 to the bead core 5 of each bead portion 4, an inner liner 10 disposed on the tire internal cavity surface and made from air-impermeable rubber, and a chafer rubber 11 for preventing rim displacement, disposed on the bead portion 4 and made of a hard rubber.

The carcass 6 is formed from a single carcass ply 6A including a toroidal main portion 6a extending between bead cores 5 and a pair of turnup portions 6b each turned up around the bead core 5 from the axial inside to the outside of the tire. The carcass ply 6A employs steel cords as carcass cords. The steel cords are aligned at an angle for example of 70 to 90 degrees with respect to a tire equator C.

A belt layer 7 made from at least three belt plies of steel cords is disposed on the radially outside the carcass 6 in the tread portion 2. The belt layer 7 of the present embodiment for example is a four-layer structure made up of an innermost belt ply 7A of belt cords aligned at an angle of approximately 60 degrees±10 degrees with respect to the tire equator C, and belt plies 7B, 7C, and 7D aligned at a small angle of approximately 15 to 35 degrees with respect to the tire equator C.

Forming the belt layer 7 on at least one position where belt cords from different plies cross each other, functions to enhance belt rigidity and firmly supporting the tread portion along approximately its entire width.

The bead portion 4 is reinforced by a bead reinforcing layer 9, and a bead apex rubber 8 that extends radially outwards from the bead core 5 to a tapered shape between the main portion 6*a* and the turnup portion 6*b* of the carcass ply 6A.

The bead apex rubber 8 of the present embodiment as shown in FIG. 2, includes a hard inner apex portion 8A disposed on the radially inside of the tire and a soft outer apex portion 8B disposed on the radial outside the hard inner apex portion 8A. This type of bead apex rubber 8 effectively prevents damage to the outer end of the bead apex 8 by deforming following a large strain of the sidewall portion 3 while boosting the inward bend rigidity of the bead portion 4.

The bead reinforcing layer 9 is formed of a cord ply of steel cords aligned for example at an angle 15 to 60 degrees with respect to the tire circumferential direction. This type of bead reinforcing layer 9 functions along with the bead apex rubber 8 to boost bead durability and in this way improve operational stability under heavy loads.

The bead reinforcing layer 9 extends in an L-shaped cross section made up of an axially outer piece portion 9*a* along the axially outer surface of the turnup portion 6*b* and a bottom piece portion 9*b* integral with the outer piece portion 9*a* and terminating in a sub-core area J. The sub-core area J refers to an area between a first radial line Y1 extending inward along the radial direction of the tire from an axial innermost point Pi of the bead core 5 and a second radial line Y2 extending inward along the radial direction of the tire from an axial outermost point Po of the bead core 5.

This type of bead reinforcing layer 9 has no axially inner portion extending radially outward along the main portion of the carcass ply 6A and so contributes to reducing the tire weight. When the tire mounted on the rim, the bottom piece portion 9*b* is gripped between the bead core 5 and a rim sheet Rs (see FIG. 1). This provides a bolstering effect for achieving excellent bend rigidity in the bead portion 4 without utilizing the axially inner portion described above.

The bottom piece portion 9*b* of the present embodiment in particular extends in a straight line substantially in parallel to a radially inner surface Si of the bead core 5, thereby uniformly enhancing a wide range of engagement with the rim. In addition, the L-shaped cross section of the bead reinforcing layer 9 with the bottom piece portion 9*b* terminating in the sub-core area J, alleviates the spring-back phenomenon, which tends to occur in U-shaped cross section bead reinforcing layers, thereby preventing poor air inflation when forming the tire. In order to reliably exhibit the above effect, the bottom piece portion 9*b* preferably extends at least 50% of the axial tire length of sub-core area J.

The axially outer piece portion 9*a* has a radial height h1 based on a bead base line BL and the turnup portion 6*b* has a radial height h2 based on a bead base line BL, the height h1 preferably being smaller than the height h2 and also preferably set in a range of from 15 to 40 mm. If set in excess of 40 mm, the compressive stress acting on the outer end of the axially outer piece portion 9*a* may increase during tire deformation, making damage likely to occur starting from the outer end. The reinforcing effect from the bead reinforcing layer 9 is less likely to be obtained if set below 15 mm. In order to alleviate the concentrated stress concentration, the difference (h2−h1) between the heights h1 and h2 is preferably not less than 5 mm, and more preferably not less than 8 mm.

The bead core 5 is a ring formed by winding a bead wire into a multicolumnar/multirow arrangement and in this embodiment has a horizontally long planar hexagonal cross section. The radially inner surface Si of the bead core 5 is approximately parallel to the rim sheet Rs to enhance a wide range of engagement with the rim R. In addition, the bead core 5 of the present embodiment is surrounded by a wrapping layer 13 to prevent the bead wire from breaking up. The wrapping layer 13 may utilize layers of various types as needed such as a rubber layer of only rubber material, a cord layer having cords embedded in a rubber material, and a canvas layer of rubber-coated canvas fabric.

Figure 4:
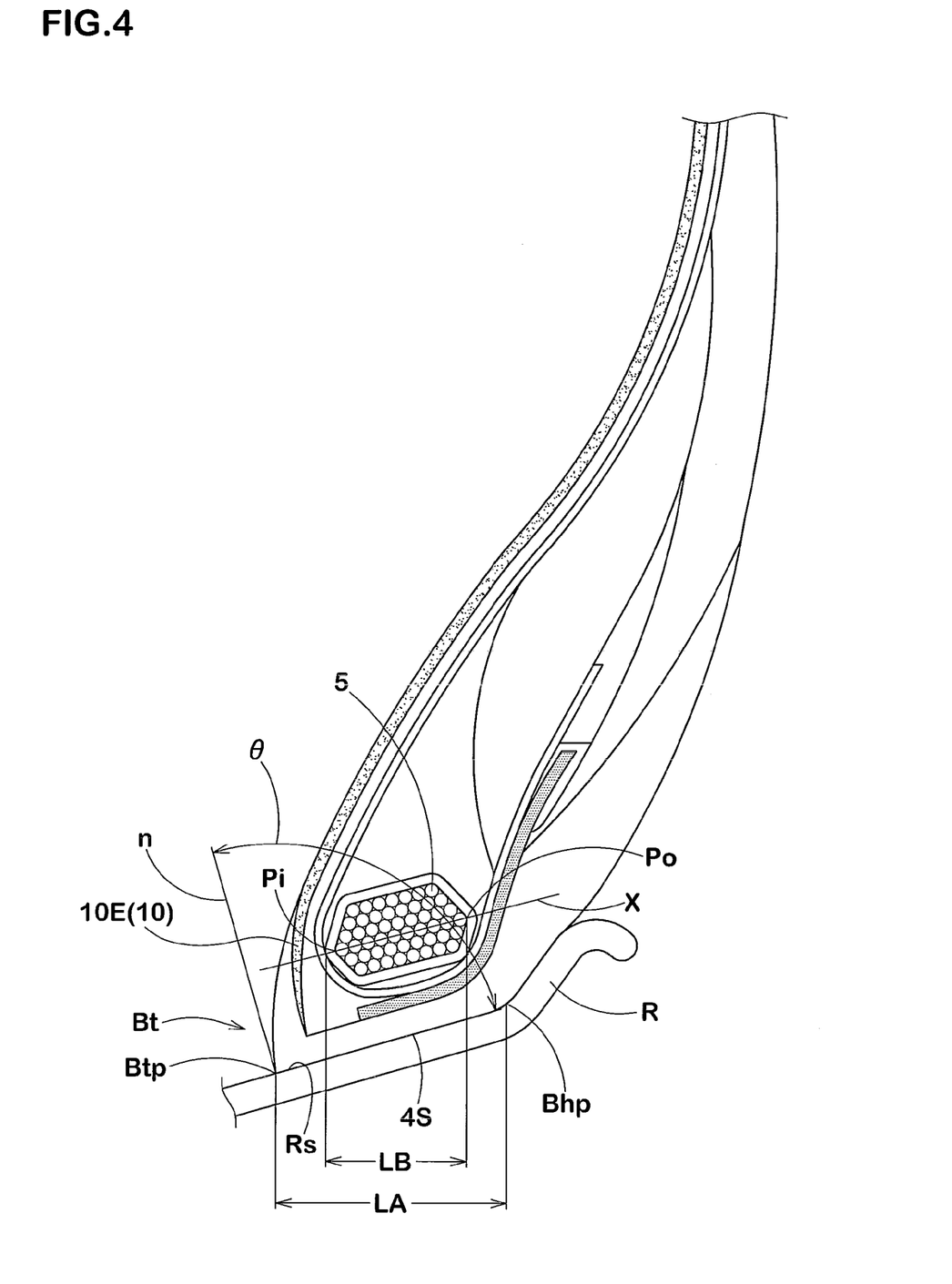
FIG. 4 is an enlarged cross sectional view of the bead portion when mounted on a rim.

The rim R is a 15 degrees-tapered rim for tubeless tires and therefore the inner surface Si is inclined at an angle of approximately 15° with respect to the axial line of the tire. Also a lateral reference line X passing through the axially innermost point P1 and axially outermost point Po of the bead core 5, and the radial outer surface So of the bead core 5 are also inclined approximately in parallel to the rim sheet Rs.

The inner liner 10 is disposed on the axial inner side of the main portion 6*a* of carcass ply 6 across an insulation rubber layer 12. The inner liner 10 therefore essentially forms the entire internal cavity surfaces of the tire.

The inner liner 10 which extends continuously between bead portions 4 is made from air-impermeable rubber such as butyl-based rubber containing a ratio of at least 60 mass units, preferably at least 80 mass units, and more preferably 100 mass units of butyl rubber (or its derivative) in a 100 mass units rubber component. The butyl-based rubber may contain as rubber other than the butyl rubber (or its derivative); natural rubber (NR), isoprene rubber (IR), and diene-based rubber such as butadiene rubber (BR) and styrene-butadiene rubber (SBR). Examples of butyl rubber derivatives include halogenated butyl rubber such as chlorobutyl rubber and brominated butyl rubber. The air-impermeable rubber may be a halide of isobutylene-paramethylstyrene copolymer instead of the butyl rubber (or its derivative).

Figure 3:
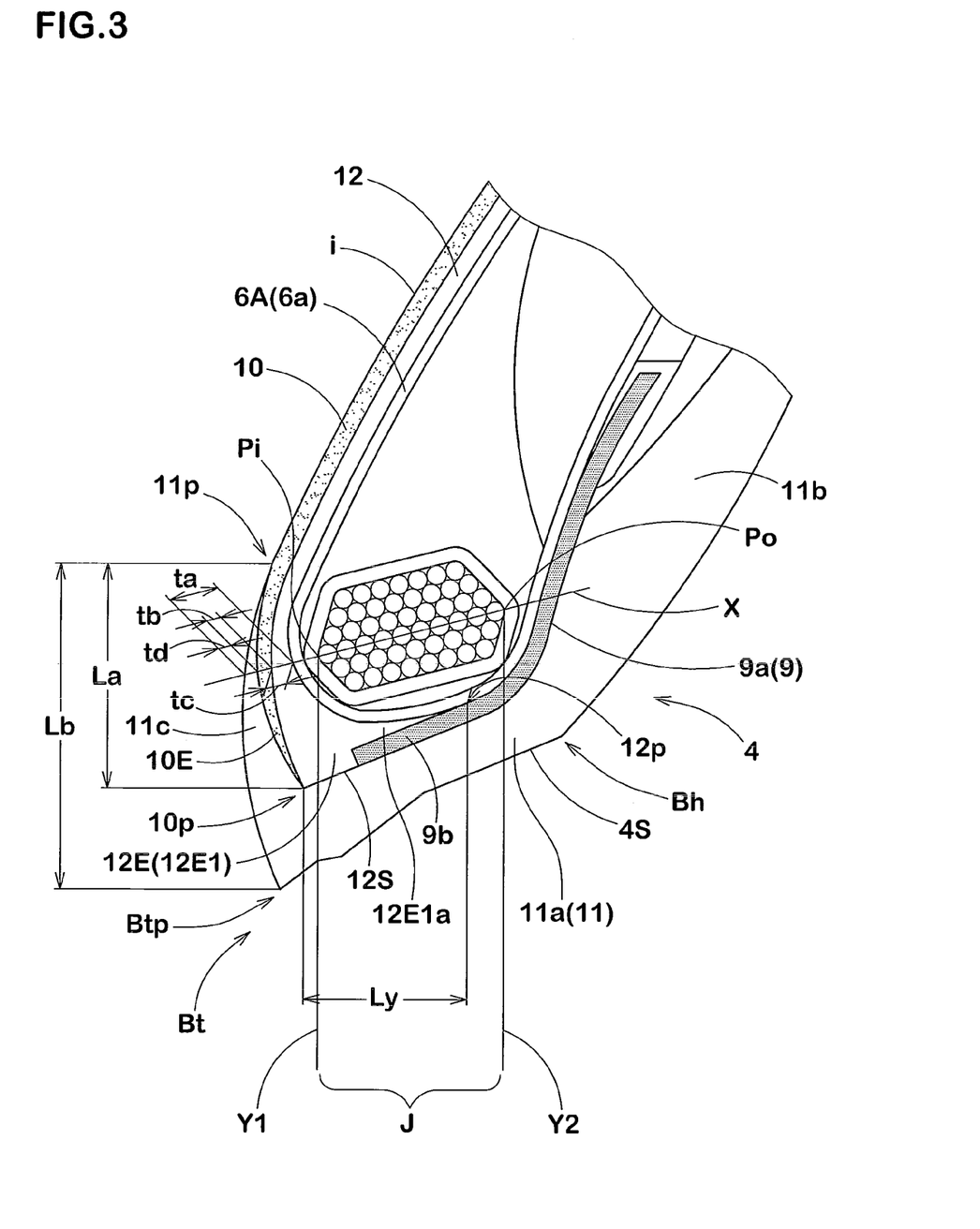
FIG. 3 is a further enlarged cross sectional view of main sections of the bead portion.

As shown in FIG. 3, the inner liner 10 includes a radially inner portion 10E that terminates on the radially inner side of lateral reference line X. This inner portion 10E of the inner liner 10 serves as a "wall" to prevent moisture from reaching the carcass ply 6A extending along the axial inner side of the bead core 5.

Further assuming the inner portion 10E of the inner liner 10 configured as described above in the present invention, the heavy-load tire 1 has a rubber thickness ta of 2.5 to 5.0 mm on the lateral reference line X ranging from the tire internal cavity surface i to the cord of the carcass ply 6A, and an inner liner thickness tb of 0.5 to 3.0 mm on the lateral reference line X, the inner liner thickness tb being smaller than the rubber thickness ta. These thicknesses are specified on the lateral reference line X because carcass cord CBU tends to frequently occur on the lateral reference line X.

By specifying the rubber thickness ta and the thickness tb of the inner liner 10 in the above-described manner prevents moisture and other components contained in the filled air from passing through the bead portion 4 and reaching the carcass cords, and in this way ensures long-term prevention of corrosion on the carcass cords.

Namely, if the rubber thickness ta on the lateral reference line X is less than 2.5 mm, then the absolute volume of the rubber is inadequate and the moisture blocking effective moisture is likely to deteriorate. In addition, rubber cracks or other defects are likely to occur due to bending that occurs during driving. If the rubber thickness ta exceeds 5.0 mm, the durability of the rubber might degrade due to thermal fatigue caused by increased heat generation during driving even though the moisture blocking effect has improved. In order to simultaneously obtain high levels of durability and effective moisture blocking, the rubber thickness ta on the lateral reference line X is more preferably not less than 2.8 mm, and more preferably not less than 3.0 mm, and still more preferably not more than 4.5 mm, and even more preferably not more than 4.0 mm.

The thickness tb of the inner liner 10 on the lateral reference line X is set at 0.5 to 3.0 mm and smaller than the rubber thickness ta. If the thickness tb of the inner liner 10 is less than 0.5 mm, then the moisture blocking effect is inadequate. If the thickness tb of the inner liner 10 exceeds 3.0 mm, the rubber flow during vulcanization makes part of the inner portion 10E likely to enter the sub-core area J. The sub-core area J is under heavy engagement pressure while the tire is mounted on the rim and therefore the inner portion 10E in the sub-core area J suffers cracking or other defects due to the engagement pressure, so that the cracking might develop into bead damage. In view of this problem, the thickness tb of the inner liner 10 is more preferably not less than 0.8 mm, and still more preferably not less than 1.0 mm, and preferably not more than 2.8 mm, and even more preferably not more than 2.5 mm.

Providing the insulation rubber layer 12 between the inner liner 10 and the main portion 6a of the carcass ply 6A enhances the adhesive force between them, thereby preventing inter-layer peeling, and also preventing contact between the inner liner 10 and the carcass cords due to the rubber flow during vulcanization. The insulation rubber layer 12 must therefore possess superior adhesion. The insulation rubber layer 12 according to the present embodiment is natural rubber (NR) containing at least 60 mass units, preferably at least 80 mass units, and more preferably 100 mass units of natural rubber (NR) in a 100 mass units rubber component. The remainder of the rubber component may consist of isoprene rubber (IR) or butadiene rubber (BR) as convenient.

This insulation rubber layer 12 in contact with the inner liner 10 extends radially inwardly and outwardly along the entire length of the inner liner 10 and includes an extension portion 12E1 having an approximately triangular cross section at the inner portion 12E and extending beyond the first radial line Y1 into the sub-core area J.

Conversely, the radially inner portion 10E of inner liner 10 is positioned in the axially inner side of the tire than the first radial line Y1. The superior adhesion of the insulation rubber layer 12 is in this way employed in the sub-core area 7 while excluding inferior adhesion on the inner liner 10 from the sub-core area J in order to inhibit cracks at the inner portion 10E of the inner liner 10 that might otherwise occur due to the large engagement pressure with the rim.

To further boost this beneficial effect, the heavy-load tire 1 preferably has an axial distance Ly of not less than 10 mm between a radially inner end 10p of inner liner 10 and an axially outer end 12p of insulation rubber layer 12. If the distance Ly is less than 10 mm, cracking tends to occur starting from the inner end 10p of the inner liner 10 due to the effect of the large engagement pressure. The upper limit of distance Ly can be set as needed as long as the extension portion 12E1 of the insulation rubber layer 12 terminates within the sub-core area J.

Moreover, since the bottom piece portion 9b of bead reinforcing layer 9 extends along a straight line, the bottom piece portion 9b gradually separates from the turnup portion 6b of the carcass ply 6A toward the axially inner side of the tire so that a tapered space is formed there between. This space is filled by a portion 12E1a which is a section of the extension portion 12E1 of insulation rubber layer 12, thereby allowing the insulation rubber layer 12 to absorb the strain acting on the end of the bottom piece portion 9b. Damage such as peeling and cracking that starts from the tip of the bottom piece portion 9b is in this way suppressed. The bottom surface 12S of extension portion 12E1 extends in approximately a straight line joined to the inner surface along the radius of the bottom piece portion 9b.

The insulation rubber layer 12 preferably has a thickness tc larger than the thickness tb of the inner liner 10 on the lateral reference line X. Setting this thickness reliably prevents direct contact between the inner liner 10 and the carcass ply 6A even from internal pressure or deformation over time. On the other hand, when the thickness tc of insulation rubber layer 12 is too large, the rubber thickness to becomes large and exothermic durability might degrade. In view of this point, the thickness tc of the insulation rubber layer 12 is preferably made not less than 1.0 mm, and more preferably not less than 1.5 mm, still more preferably not more than 3.5 mm, and even more preferably not more than 3.0 mm.

The chafer rubber 11 is preferably formed from rubber with a hardness Hs of 70 to 80 degrees rubber hardness based on Durometer Type-A hardness in order to prevent rubber chipping due to contact with the rim, crushing (sagging) and/or rubber wear due to compression and other damage. In view of the need for wear resistance, impact resilience, aging resistance, and other properties, this type of chafer rubber 11 is more specifically formed from a rubber mixture of 20 to 60 mass units natural rubber (NR) and 80 to 40 mass units butadiene rubber (BR) in 100 mass units rubber component.

The chafer rubber 11 includes a base portion 11a disposed radially inside the bottom piece portion 9b of the bead reinforcing layer 9 and exposed on the bead bottom surface 4S, an axially outer portion 11b integral with the base portion 11a and extending radially outward along the outer surface of the tire from a bead heal Bh, and an axially inner portion 11c integral with the base portion 11a and extending radially outwards from the bead toe Bt along the internal cavity surface i so as to cover the radially inner portion 10E of the inner liner 10. The axially outer portion 11b is exposed on the tire outer surface at least over an area in contact with the flange of the rim R, and acts along with the base portion 11a exposed on the entire bead bottom surface 4S to prevent rim displacement during driving.

The axially inner portion 11c covers the axially inner portion 10E of the inner liner 10 to prevent the inner portion 10E from directly rubbing on the rim flange, thereby preventing damage that might possible occur when the tire is mounted on or removed from the rim.

When the tire is mounted on or removed from the rim, the bead toe Bt deforms causing a large shearing force to occur between the axially inner portion 11c and the inner portion 10E of the inner liner 10 which makes cracks prone to occur. In view of this problem, the heavy-load tire 1 of the present embodiment has a radially overlapped distance La of 5 mm or more, and preferably to 10 mm between a radial outer end 11p of the axially inner portion 11c and the radial inner end 10p of the inner liner 10. This distance La maintains a sufficient contact length between the axially inner portion 11c and the inner liner 10. This overlapped distance La also reliably ensures that no inter-layer cracking or other damage occurs between the axially inner portion 11c and the inner portion 10E and thus further improves the durability of the bead portion. If the overlapped distance La is too large, then the possibility of improved resistance to cracking decreases and the rigidity of the bead toe Bt becomes excessive to the detriment of rim mountability. In view of these facts, the overlapped distance La is preferably set not more than 20 mm, and more preferably not more than 15 mm.

The tire 1 preferably has a radial distance Lb of from 15 to 35 mm between the radially outer end 11p of the axially inner portion 11c and the bead toe end Btp. If the radial distance Lb is less than 15 mm, then damage from rubbing on the rim flange during mounting on or removing the tire from the rim cannot be sufficiently prevented. If the radial distance Lb exceeds 35 mm, then the rigidity of the bead toe point Bt becomes excessive making it more difficult to mount the rim.

There are no particular limitations on the thickness td of the axially inner portion 11c of chafer rubber 11 on the lateral reference line X. However, if the thickness td is too small, then cracks or other damage are likely to occur due to deformation of the bead toe point Bt during mounting or removing the tire from the rim. Conversely, if the thickness td is too large, the rubber thickness to becomes large so that exothermic durability might degrade. In view of this effect, the thickness td of the axially inner portion 11c of chafer rubber 11 is preferably not less than 0.2 mm, and more preferably not less than 0.5 mm, and still more preferably not more than 4.0 mm, and even more preferably not more than 3.5 mm.

The heavy-load tire 1 of the present embodiment when mounted on the regular rim R has a ratio LB/LA of not more than 0.7 between the axial length LA of the bead bottom surface 4S, which is the tire axial distance between the bead toe end Btp and bead heel end Bhp; and the axial length of the bead core LB which is the tire axial distance between the axial innermost point Pi and outermost point Po of the bead core 5. The bead toe point Bt has a toe angle theta of not less than 85 degrees, the toe angle theta being defined by a tangent line "n" with respect to the tire internal cavity surface at the bead toe end Btp and the rim sheet surface Rs. This toe angle contributes to securing a sufficient volume for the bead toe point Bt thereby stabilizing rubber flow during vulcanization. This toe angle theta also inhibits fluctuations in the thickness of the inner portion 10E of the inner liner 10, and especially in the thickness tb of the inner portion 10E on the lateral reference line X, so that the thickness tb can be securely set within the above-described range.

While the preferred embodiment of the present invention has been described in detail, the present invention is not limited by this description, and various modifications may be made.

[Comparison Test]

Heavy-load radial tires in a size 275/80R22.5 and the structure shown in FIG. 1 were trial manufactured according to the specifications listed in Table 1 and a test made to compare the bead durability of each trial tire. Parameters other than listed in Table 1 were all identical. The test was performed as follows.

Bead Durability:

The test tires were left to stand for four weeks at an internal pressure of 800 kPa, an oxygen concentration of 100%, and a temperature of 80 degrees Celsius, and subjected to a drum durability test under the following conditions.

Rim size: 22.5×7.50

Internal pressure: 800 kPa

Vertical load: 46.34 kN

Speed: 40 km per hour

Drum diameter of drum tester: 1707 mm

The amount of driving time before damage to the bead portion occurred was measured on each trial tire. The evaluation is shown in the form of an index where the driving time of the comparative example was 100. A larger value indicates a superior result. When tire damage occurred, a worker tore down the damaged tire and made a visual inspection of the type of damage.

The results are shown in Table 1.

TABLE 1

| | Ex. 1 | Com. Ex. 1 | Com. Ex. 2 | Com. Ex. 3 | Ex. 2 | Ex. 3 | Ex. 4 | Ex. 5 | Ex. 6 | Ex. 7 | Com. Ex. 4 | Com. Ex. 5 |
|---|---|---|---|---|---|---|---|---|---|---|---|---|
| Butyl rubber content of inner liner | 90 | 100 | 100 | 100 | 100 | 100 | 100 | 100 | 100 | 100 | 100 | 100 |
| Cross section of bead reinforcing layer | L | L | L | L | L | L | L | L | L | L | L | L |
| Rubber thickness ta [mm] | 2.5 | 1.9 | 2.5 | 2.0 | 2.5 | 2.5 | 2.5 | 3.0 | 4.0 | 5.0 | 6.0 | 6.0 |
| Thickness tb of inner liner [mm] | 0.8 | 0.8 | 0.4 | 0.5 | 0.5 | 0.8 | 1.0 | 1.0 | 2.0 | 2.0 | 2.0 | 3.2 |
| ta/tb ratio [%] | 32 | 42 | 16 | 25 | 20 | 32 | 40 | 33 | 50 | 40 | 33 | 53 |
| Thickness tc of insulation rubber layer [mm] | 1.0 | 0.7 | 1.1 | 1.0 | 1.0 | 1.0 | 1.2 | 1.5 | 1.0 | 1.5 | 2.0 | 1.5 |
| Thickness td of chafer rubber [mm] | 0.7 | 0.4 | 1.0 | 0.5 | 1.0 | 0.7 | 0.3 | 0.5 | 1.0 | 1.5 | 2.0 | 1.3 |
| Distance La [mm] | 14 | 14 | 6 | 7 | 7 | 13 | 16 | 17 | 16 | 15 | 16 | 17 |
| Distance Lb [mm] | 20 | 16 | 21 | 16 | 20 | 19 | 15 | 16 | 20 | 22 | 23 | 21 |
| Distance Ly [mm] | 16 | 17 | 16 | 15 | 16 | 16 | 17 | 16 | 15 | 18 | 16 | 17 |
| Bead durability [index] | 115 | 100 | 80 | 78 | 126 | 178 | 186 | 193 | 201 | 203 | 113 | 109 |
| Damage type | CBU | CBU | CBU | CBU | PTL | PTL | PTL | PTL | PTL | PTL | PTL | PTL |

As can be seen in Table 1, no CBU occurred in the tires in the examples of the embodiment and PTL (loosening at the outer end of the turnup portion of the carcass ply) was prevented thus demonstrating superior bead durability. The same effect was also confirmed in tires of other sizes.

The invention claimed is:

1. A heavy-load tire comprising:
  a tread portion,
  a pair of sidewall portions,
  a pair of bead portions each with a bead core therein,
  a carcass comprising a carcass ply of cords including a main portion extending between the bead cores through the tread portion and the sidewall portions, and a pair of turnup portions each turned up around the bead core from the axially inside to the outside of the tire, and
  an inner liner made from air-impermeable rubber and disposed on tire internal cavity surface, an insulation rubber layer disposed between the inner liner and the carcass, a chafer rubber disposed in each said bead portion, and a bead reinforcing layer with an L-shaped cross section disposed in each said bead portion, wherein the bead reinforcing layer is made up of an axially outer portion disposed along the axially outside of the turnup portion and a bottom portion extending axially inwardly from the outer portion and terminating in a sub-core area, the sub-core area defined between a first radial line extending radially inwards along the radial direction of the tire from an innermost axial point of the bead core, and a second radial line extending radially inwards along the radial direction of the tire from an outermost axial point of the bead core, the inner liner includes a radially inner portion extending radially inwardly beyond a lateral reference line and terminating at a position radially inside the lateral reference line, the lateral reference line defined by a straight line passing through the innermost axial point and the outermost axial point of the bead core, the insulation rubber layer extends to a position radially inside the bead core to have a radially inner portion extending in said sub-core area, the chafer rubber comprises:
  a base portion disposed radially inside said bottom portion of the bead reinforcing layer to define a bottom surface of the bead portion,
  an axially outer portion extending radially outwardly from said base portion to define an outer surface of the tire, and
  an axially inner portion extending radially outward from the base portion so as to cover said radially inner portion of the inner liner and to define a tire internal cavity surface extending radially outwardly from the bead toe, the radial overlap La between said axially inner portion of the chafer rubber and said radially inner portion of the inner liner covered therewith is in a range of from 5 to 20 mm, said radially inner portion of the inner liner is positioned on axially inside said first radial line, the radially inner end of the bead reinforcing layer is sandwiched between said radially inner portion of the insulation rubber layer and the chafer rubber, the axial distance Ly between the radially inner end of said radially inner portion of the inner liner and the axially outer end of said radially inner portion of the insulation rubber layer is at least 10 mm, and a thickness ta measured from the tire internal cavity surface to the cord of the carcass ply along said lateral reference line is in a range of from 2.5 to 5.0 mm, and includes a thickness tb of the inner liner in a range of from 0.5 to 3.0 mm.

2. The heavy-load tire according to claim 1, wherein the thickness ratio (tb/ta) is in a range of from 20 to 50%.

3. The heavy-load tire according to claim 1, wherein
a radial distance Lb between the bead toe end and the radially outer end of the axially inner portion of the chafer rubber is in a range of from 15 to 35 mm.

* * * * *